US012423960B1

(12) United States Patent
Balles et al.

(10) Patent No.: US 12,423,960 B1
(45) Date of Patent: Sep. 23, 2025

(54) CONCEPT SHIFT DETECTION AND CORRECTION USING PROBABILISTIC MODELS AND LEARNED FEATURE REPRESENTATIONS

(71) Applicant: Amazon Technologies, Inc., Seattle, WA (US)

(72) Inventors: Lukas Stefan Balles, Berlin (DE); Giovanni Zappella, Berlin (DE); Cedric Philippe Archambeau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 796 days.

(21) Appl. No.: 17/707,004

(22) Filed: Mar. 29, 2022

(51) Int. Cl.
| | | |
|---|---|---|
| G06V 10/77 | (2022.01) | |
| G06F 11/07 | (2006.01) | |
| G06N 20/20 | (2019.01) | |
| G06V 10/772 | (2022.01) | |
| G06V 10/774 | (2022.01) | |

(52) U.S. Cl.
CPC ...... *G06V 10/7747* (2022.01); *G06F 11/0769* (2013.01); *G06N 20/20* (2019.01); *G06V 10/772* (2022.01)

(58) Field of Classification Search
CPC .. G06V 10/7747; G06V 10/772; G06N 20/20; G06F 11/0769
See application file for complete search history.

(56) References Cited

U.S. PATENT DOCUMENTS

2019/0379589 A1\* 12/2019 Ryan ..................... G06F 17/142
2021/0241179 A1\* 8/2021 Karanth ................. G06N 20/20

OTHER PUBLICATIONS

Kingetsu et al, "Born-Again Decision Boundary: Unsupervised Concept Drift Detection by Inspector Neural Network," 2021, International Joint Conference on Neural Networks (IJCNN) , 8 Pages (Year: 2021).\*
Wikipedia, "Kolmogorov-Smirnov test" [online]. Wikipedia.com, 2025 [retrieved on Jan. 30, 2025]. Retrieved from the Internet: <URL: https://en.wikipedia.org/wiki/Kolmogorov-Smirnov_test>, 11 Pages (Year: 2025).\*

\* cited by examiner

*Primary Examiner* — David F Dunphy
(74) *Attorney, Agent, or Firm* — Nicholson DeVos Webster & Elliott LLP

(57) ABSTRACT

Techniques for concept shift detection and correction using probabilistic models and learned feature representations are described. A gaussian process model is trained using representations generated by a primary machine learning (ML) model for existing training data elements in a training memory. For a new batch of data elements, representations again generated by the primary ML model can be used as input for the gaussian process model to generate predictive distributions. When the true targets for the new data elements are not sufficiently likely according to the corresponding predictive distributions, concept shift is likely and the training memory can be purged of the existing data elements before further retraining of the primary ML model.

20 Claims, 10 Drawing Sheets

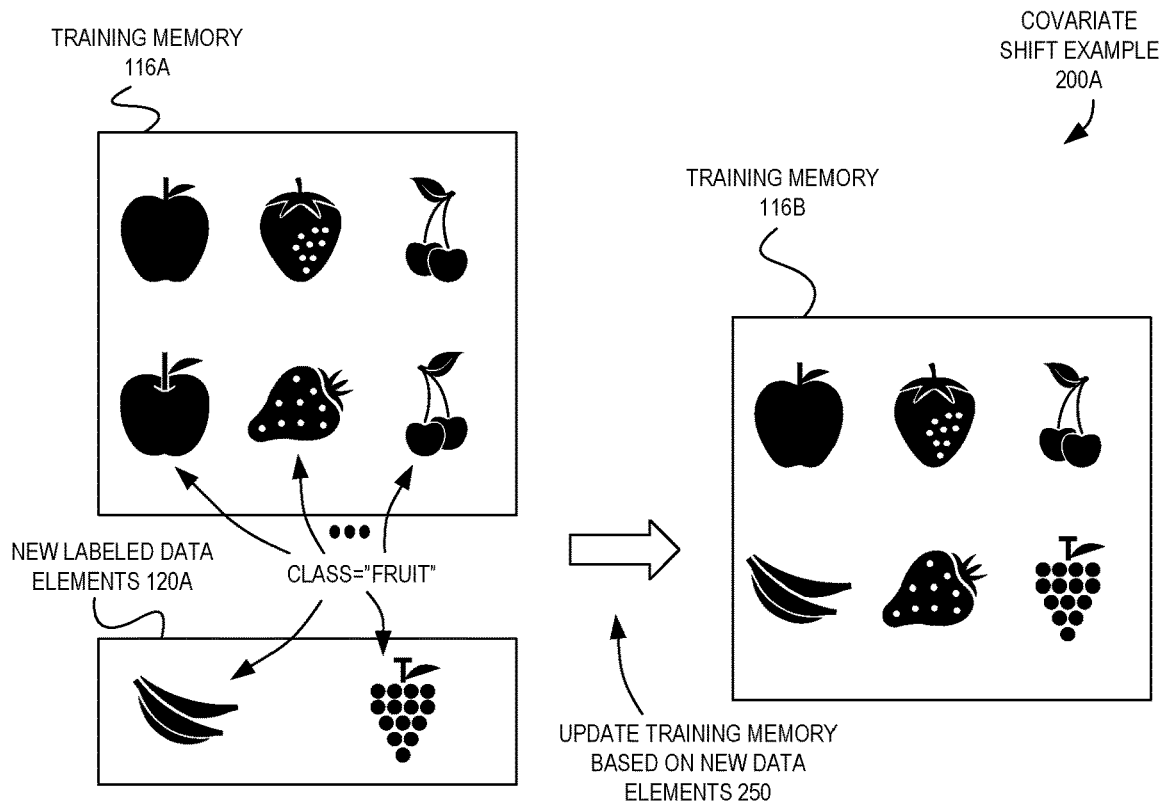
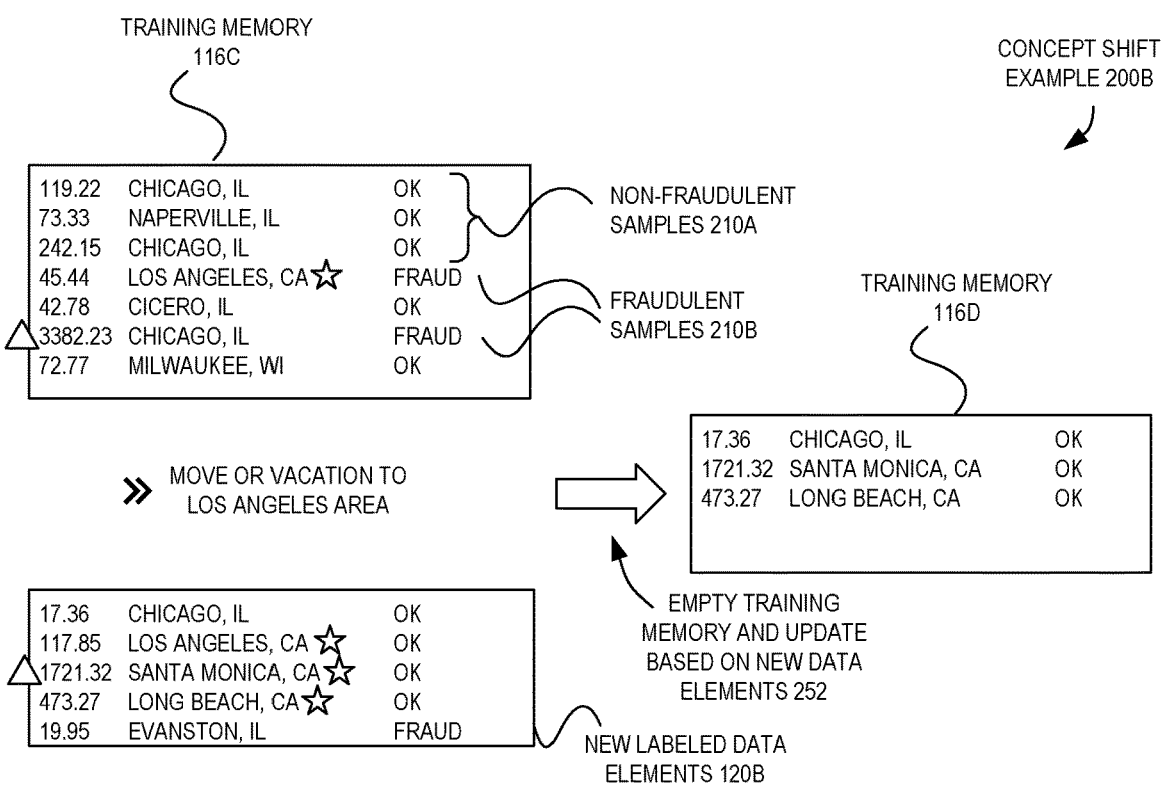
FIG. 2

OPERATIONS
600

GENERATE PREDICTIONS FOR DATA ELEMENTS VIA USE OF A FIRST MACHINE LEARNING (ML) MODEL TRAINED BASED AT LEAST IN PART USING REPRESENTATIONS GENERATED VIA USE OF A SECOND ML MODEL 602

DETERMINE, BASED AT LEAST IN PART ON AN ANALYSIS OF THE PREDICTIONS AND TARGET VALUES ASSOCIATED WITH THE DATA ELEMENTS, A LIKELIHOOD OF CONCEPT SHIFT EVIDENCED VIA THE DATA ELEMENTS 604

TRANSMIT A MESSAGE IDENTIFYING THE LIKELIHOOD OF CONCEPT SHIFT 606

CONCEPT SHIFT DETECTION AND CORRECTION USING PROBABILISTIC MODELS AND LEARNED FEATURE REPRESENTATIONS

BACKGROUND

The field of machine learning has become widely accepted as a significant driver of the future of technology. Organizations everywhere now use machine learning techniques to address a wide variety of problems, such as optimizing aspects of their products, internal processes, customer experience, etc. While the high-level view of machine learning sounds simple—e.g., provide training data to a computer to allow the computer to automatically learn from the training data to generate a model that can make predictions for other data—implementing machine learning in practice can be tremendously difficult.

These difficulties are partially due to the underlying algorithmic and mathematical complexities of machine learning algorithms, which are often developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with. As another example, machine learning models deployed in production systems often need to be retrained frequently to adapt to changes in the data which it is being fed.

BRIEF DESCRIPTION OF DRAWINGS

Various examples in accordance with the present disclosure will be described with reference to the drawings, in which:

FIG. 2 is a diagram illustrating an exemplary covariate and concept shifts according to some examples.

FIG. 6 is a flow diagram illustrating operations of a method for concept shift detection and correction using probabilistic models and learned feature representations according to some examples.

DETAILED DESCRIPTION

The present disclosure relates to methods, apparatus, systems, and non-transitory computer-readable storage media for concept shift detection and correction using probabilistic models on top of learned feature representations. According to some examples, different types of data distribution shifts evidenced within data can be detected and differentiated to enable different, drift-specific responsive corrective actions to improve the functioning of associated machine learning (ML) models. Accordingly, a machine learning model can be retrained in a specific manner selected dependent upon a type of dataset drift detected, thus improving the functioning of the machine learning model after a dataset drift as well as the overall system that is reliant upon the model.

In some examples, concept drift that may impact the performance of a primary ML model can be detected and corrected via use of a probabilistic model (e.g., a Gaussian Process (GP) model or similar type of model providing predictive distributions) and learned feature representations. A probabilistic model can be trained via use of data elements within a memory providing a sliding window of data elements and their corresponding target values. Learned representations of the data elements can be obtained via use of the primary ML model, e.g., generated by a penultimate layer of a neural network model. A new batch of data elements can be analyzed for concept drift by generating representations of the data elements via use of the primary ML model and generating predictive distributions via use of these representations as inputs to the probabilistic model. When a target value (also commonly referred to as a "label") associated with a particular data element is determined to be sufficiently unlikely under the predictive distribution (e.g., more than some number of standard deviations from a mean value of the predictive distribution), this is evidence of concept drift. In some examples, a criteria may be used to determine a likelihood of concept drift evidenced within the new batch of data elements, which can be based on a number or percentage of the data elements (in the new batch) falling outside of the predictive distribution's "likely" range of values, and/or based on a measure of how far outside the distribution each target value lies. When concept drift is detected with a sufficient likelihood, the sliding window can be purged (or emptied) to remove the previous data elements from further use in training to eliminate the now-incorrect samples from use. In some examples, instead ones of the new batch of data elements are sampled and inserted into the window for use in training.

Figure 1:
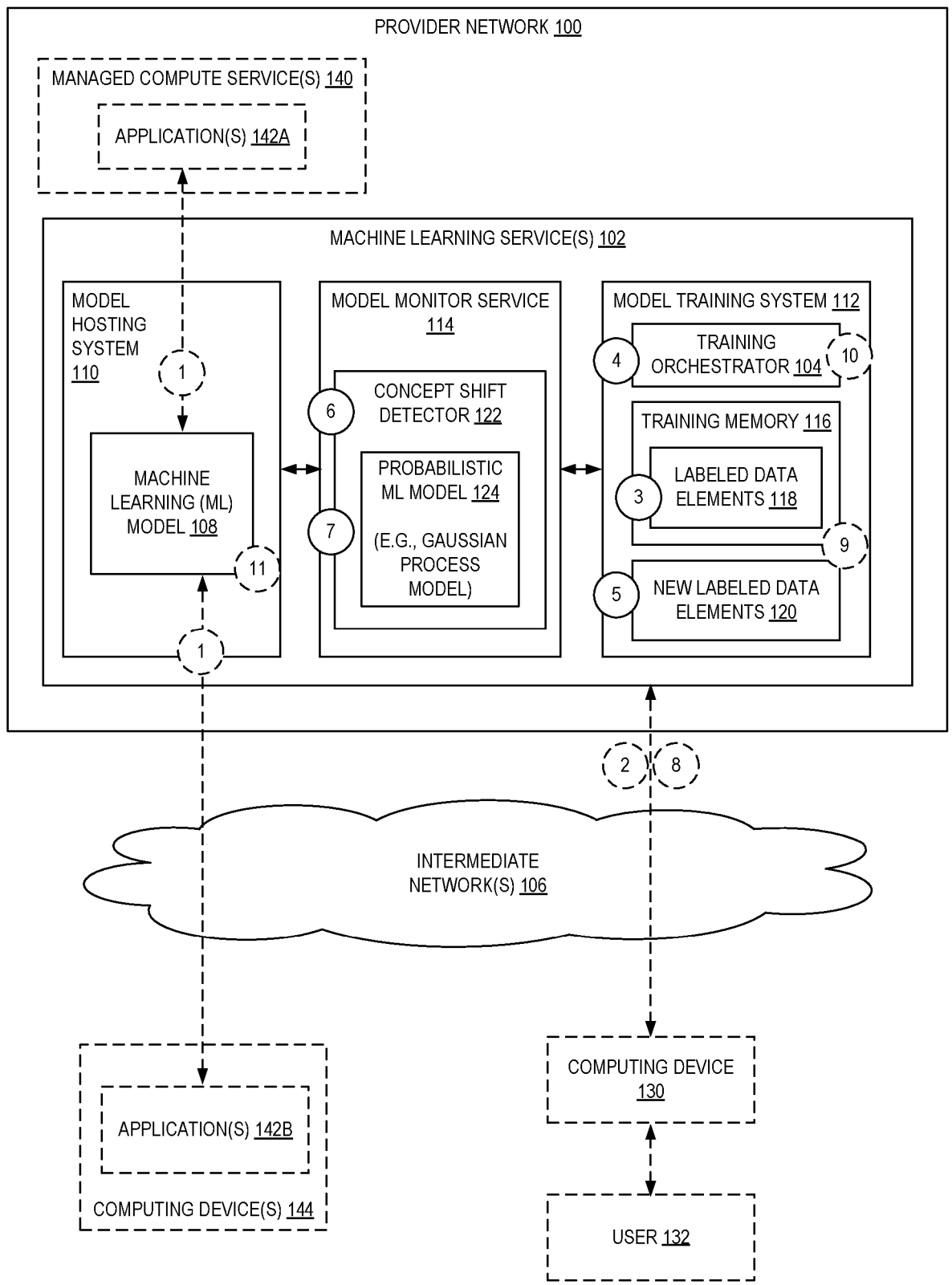
FIG. 1 is a diagram illustrating an exemplary environment for concept shift detection and correction using probabilistic models and learned feature representations according to some examples.

FIG. 1 is a diagram illustrating an exemplary environment for concept shift detection and correction using probabilistic models and learned feature representations according to some examples. In FIG. 1, a model monitor service 114 includes a concept shift detector 122 implemented within a multi-tenant provider network 100 that can detect concept shift evidenced within data elements utilized for training ML models. The model monitor service 114 can be implemented as software executed by one or often multiple computing devices at one or multiple geographic locations. FIG. 1 also includes a model hosting system 110 used for hosting ML models (e.g., for production inference) and a model training system 112 used for training ML models, both of which are described in further detail herein and may also be implemented as software executed by one or often multiple computing devices at one or multiple geographic locations.

A provider network 100 (or, "cloud" provider network) provides users (e.g., user 132) with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users 132 (or "customers") of provider networks 100 may interact with the provider network 100 via a computing device 130 (e.g., a personal computer, server computer device, mobile device, or the like) and can use one or more user accounts that are associated with a customer account, though these terms can be used somewhat interchangeably depending upon the context of use.

Users 132, via use of a computing device 130, can interact with a provider network 100 across one or more intermediate networks 106 (e.g., the internet) via one or more interface(s) of the provider network, such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources such as compute, storage, and networking resources, applications, and services. A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

A cloud provider network can be formed as multiple regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users may connect to an AZ of the cloud provider network via a publicly accessible network by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

In some examples, a provider network 100 can provide one or more managed compute services 140 to allow users to execute various applications 142A such as a hardware virtualization service, container service, an on-demand code execution service, etc. An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code, such as virtual machines, containers, etc. An on-demand code execution service itself may make use of another managed compute service 140, such as a hardware virtualization service, to execute this code.

A hardware virtualization service (referred to in various implementations as an elastic compute service, a virtual machines service, a computing cloud service, a compute engine, or a cloud compute service) enables users of the provider network 100 to provision and manage compute resources such as virtual machine instances. As is indicated herein, virtual machine technology can use one physical server computing device to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more processors (e.g., CPUs) that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as "compute instances" or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service (referred to in various implementations as a container service, cloud container service, container engine, or container cloud service), such as the Amazon Elastic Container Service (ECS)™, can be a highly scalable, high performance container management service that supports containers (e.g., Docker containers) and allows users to easily run applications on a managed cluster of compute instances, eliminating the need for users to install, operate, and scale their own cluster management infrastructure. With simple API calls, users can launch and stop container-enabled applications, query the complete state of their clusters, and/or utilize provider network features such as virtual firewalls, load balancing, virtual block storage volumes, and/or Identity Access Management (IAM) roles. Users can use a container service to schedule container placement across a cluster based on their unique resource needs and availability requirements or can integrate their own schedulers or third-party schedulers to meet business or application specific requirements.

Thus, users may utilize these or other managed compute services 140 to implement and run an application 142A within the "cloud" provider network 100, though users may also implement and run applications 142B via computing devices 144 in other locations, such as a third-party cloud provider network, in a public or private data center, in an organization's on-premises environment, in a private office or residence, etc. Such an application 142 may be a "production" application that serves a production need of an organization (e.g., as a website, application backend, business application, or the like) for one or multiple instances of the application.

In recent years, many applications 142 have been developed to make use of ML techniques. One such deployment configuration includes utilizing ML models 108 hosted by a model hosting system 110 (e.g., of a machine learning service 102 such as AWS™ SageMaker) to make predictions (or "inferences"), such as to predict a likelihood of fraud in a transaction, identify a person or object in a video or still frame, recommend media content, generate weather predictions, etc.

Most ML models deployed in production systems need to be retrained frequently to adapt to changes in the distribution of the data which it is being fed. Techniques from the field of continual learning attempt to streamline this process by efficiently training an ML model (e.g., via use of a training orchestrator 104 of a model training system 112) on new incoming data batches (e.g., new labeled data elements 120) without forgetting knowledge obtained from previously seen data. For example, an ML model 108 may be retrained every day based on use of a moving window of data elements (e.g., labeled data elements 118 within a training memory 116 making up the moving window) obtained during the past day, seven days, thirty days, three months, or the like, which can avoid costly retraining from starting anew.

Real-world data streams, however, can undergo many types of dataset drift (also referred to commonly as "distribution drift," or "distribution shift"). Dataset drift is a common problem in predictive modeling that occurs when the joint distribution of inputs and outputs differs between training and test/utilization stages. Dataset drift is present in most practical ML applications and may result due to bias introduced by experimental design or the irreproducibility of the testing/utilization conditions at training time.

For example, FIG. 2 is a diagram illustrating an exemplary covariate and concept shifts according to some examples.

One type of dataset drift is known as "covariate shift," which occurs when only the input distribution changes between the training environment and live environment. Thus, this change does not affect the functional relationship between the input and the target. Typically, with covariate shifts, existing or previous data is still valid and useful for retraining purposes. For example, an ML model trained to recognize dogs from images may suddenly encounter images from other breeds of dogs (e.g., pugs) that did not exist in the dataset the ML model was trained on (e.g., only Labrador retrievers and Doberman Pinschers). In this case, the ML model would still benefit from being trained using Labrador images and Doberman Pinschers but would also benefit from the inclusion of pug images in a next retraining.

A covariate shift example 200A is shown in FIG. 1 with regard to an ML model trained to recognize images of fruit, which may be trained via a sliding window training memory 116A including data elements (in this case, images, though many other types of data can be used in other scenarios as known to those of skill in the art) corresponding to apples, strawberries, and cherries, where these data elements have a common associated class label ("fruit" for example). This model may work very well for a particular use case where only these types of fruit are present and need to be detected. However, in the event of a change where new types of fruit also need to be detected—as reflected by images of bananas and grapes within a new batch of labeled data elements 120A also labeled with a same class label (e.g., "fruit")—the model may not perform well (in detecting these images as including representations of fruit) due to covariate shift. In this case, the previous data elements (corresponding to apples, strawberries, and cherries) remain valid though the model would benefit from the further inclusion of the new types of fruit. Thus, in some examples, the sliding window training memory 116B may be updated 250 by sampling ones of the new batch of labeled data elements 120A into the training memory 116B along with some existing data elements from previous state of the training memory 116A.

However, another type of dataset drift is referred to as "concept shift," which is the changing in relationship between the input and target output. Like other dataset drifts, concept shift can happen gradually over time or suddenly. When a concept shift occurs, however, some or all of the previous data is no longer valid for further training purposes. For example, a fraud detection model may analyze financial transactions looking for fraud based on a variety of factors (e.g., a location of a credit card transaction, a time of day, a charge amount, whether the credit card was present, etc.). In the case of a new fraudulent scheme being developed, a previous combination of factors that was previously valid and non-fraudulent may now be fraudulent and need to be identified as such. In this case, if previous (now incorrect) examples are left in the training dataset, the retrained ML model will not be able to correctly detect this new fraud due to having been trained using similar examples that have different labels. Accordingly, in the case of a concept shift, it is important to "forget" or otherwise eliminate the knowledge of the previous data elements that had correct labels (at the time) but now are incorrect due to the concept shift.

A concept shift example 200B is shown in FIG. 1 with regard to an ML model trained to identify fraudulent transactions. In this example, a sliding window training memory 116C includes data elements in the form of financial transaction metadata describing purchases or transactions involving a particular person. Here, the training memory 116C includes non-fraudulent samples 210A (as indicated by a fourth column of data indicating "OK" as opposed to "FRAUD"), where these transactions occurred in or near a city of Chicago, Illinois for amounts less than two-hundred and fifty dollars. Two fraudulent sample 210B data elements are also included, with a first likely being fraudulent due to the transaction occurring in a distant location the person is not located in (here, Los Angeles) and a second likely being fraudulent due to the transaction being of an atypical amount (here, more than three thousand dollars). At some point, an event may occur that results in a concept shift—here, we assume that the user moves or has a vacation/holiday to the Los Angeles area. Such an event may naturally involve more legitimate, non-fraudulent transactions in this new location, and these transactions may be of larger size than typical. Thus, the new batch of labeled data elements 120B may include multiple transactions near the Los Angeles area (as shown by the star icon) that should no longer be considered fraudulent (though the existing model may predict them as fraudulent). The new batch of labeled data elements 120B may also include larger transactions (as shown by the triangle icon) that should no longer be considered fraudulent (though the existing model may predict them as fraudulent). The new batch of labeled data elements 120B may also include samples that are now fraudulent (e.g., a transaction in Evanston, Illinois) that may not have been previously fraudulent due to its location being near Chicago and involving a "small" transaction amount.

In this case, the concept of a "large" transaction or "atypical location" has fundamentally changed for this particular use case, and thus, old fraudulent examples 210B (and perhaps even ones of the non-fraudulent samples) should be quickly forgotten to allow the ML model to respond to this change. Accordingly, the sliding window training memory 116D can be emptied and updated 252 based on sampling from the new batch of labeled data elements 120B, eliminating the previous, slow updating of the model (e.g., via multiple different model retraining occurrences that take place until the "stale" examples are expired moved out of the sliding window due to the passage of time).

Existing continual learning methods, however, operate under the assumption that the data distribution does not undergo a concept shift. Instead, typical "shift detection" techniques merely monitor shifts in the input distribution (which may catch covariate shifts but not concept shifts) and/or monitor drops in the performance metrics of a deployed model (which may result from many factors, including both covariate shifts and concept shifts). Without specialized knowledge of what the problem is, these systems cannot apply different specific fixes required to solve specific problems. Thus, such continual learning methods will suffer from poor performance for a substantial amount of time, e.g., until the now-incorrect samples are removed from the sliding window of training samples due to the passage of time. This is clearly problematic in nearly all environments, as the model will not perform well for certain classes of inputs for a potentially long amount of time. For example, it can be catastrophic for certain systems (e.g., security systems, medical analysis tools, fraud detectors, etc.) to perform extremely poorly for nearly any amount of time due to a concept shift having occurred.

Turning back to FIG. 1, examples disclosed herein provide a system that can detect concept shifts in data streams and make appropriate corrections to allow a retrained model to quickly adapt to such changes. In this example, one or more applications 142A-142B utilize an ML model 108 hosted by a model hosting system 110, as shown by dashed (optional) circle (1).

At dashed circle (2), a user 132 associated with an application 142 may configure model monitoring via the model monitor service 114 for this ML model 108. This configuration may include enabling concept shift detection (e.g., via use of the concept shift detector 122 system) and can include configuring the detection according to user-specified requirements. For example, the user 132 may indicate one or more criteria to define what amount of likely concept shift is needed before taking some responsive action, such as notifying the user 132 via a message, publishing an event to another system, initiating a retraining and/or modifying the training memory 116 on its own, etc.

The user-specified criteria may include one or more threshold values, such as a number or percentage of examples in a new batch of data elements that "substantially" deviate (according to some defined threshold) from a predicted distribution for the data element, before indicating that a likely concept drift has occurred. As another example, the criteria may identify a numeric score (e.g., 90% or higher likelihood, 75% or higher likelihood) or category (e.g., low, medium, or high likelihood) of a determined likelihood score generated by the concept shift detector 122 that, when satisfied, is to trigger a responsive action on the part of the concept shift detector 122. Thus, as one example, the user may define a criteria indicating that an automatic update of the training memory 116 and subsequent retraining of the ML model 108 (or some other action or actions) is to occur when the concept shift detector 122 detects 5% of the new labeled data elements 120 being at least one standard deviation from a mean of a predictive distribution generated for the corresponding data element by the probabilistic model 124, or upon one or more of the new labeled data elements 120 being more than two standard deviations from the mean of the predictive distribution for the data elements, or both. However, various other types of criteria may be implemented or supported in various implementations, and these criteria may be reliant on other factors, such as other performance metrics involving the ML model 108, metrics associated with the application(s) 142, or the like.

As part of circle (2), the user 132 may also initiate automated (or manual) retraining of the ML model 108 and/or automated (or manual) collection of labeled data elements 118 at circle (3) in a sliding window training memory 116. Thus, upon a configured schedule, event, or manual basis (e.g., upon receipt of a command originated on behalf of the user 132), a training orchestrator at circle (4) can retrain the ML model 108 based on use of the data elements 118 existing within the training memory 116 and re-deploy the updated retrained version of the ML model 108 to the model hosting system 110.

The user 132 may also configure the updating of the training memory 116 according to new "batches" of labeled data elements 120 provided at circle (5), on a periodic basis by the user, by a separate system (e.g., an automated or manual labeling service), by the application 142. For example, new labeled data elements 120 may be uploaded to a particular storage location (e.g., a bucket or folder provided by a non-illustrated storage service of the provider network 100), and this optionally may trigger the updating of the training memory 116 (e.g., by sampling from these elements, or by adding all of these elements to the training memory 116, which automatically updates a sliding window of the memory according to time elapsing). Thus, in some examples, this new batch of data elements 120 is provided along with the corresponding labels, though in other examples the data elements 120 are provided without labels and then labeled thereafter, such as via use of a labeling service (e.g., AWS GroundTruth, Amazon Mechanical Turk, or the like).

With each new batch of new labeled data elements 120, the concept shift detector 122 at circle (6) may be configured to watch for various types of data drift via use of a probabilistic model 124 at circle (7), such as concept drift, and when found act in response based on the type of dataset drift detected.

Figure 3:
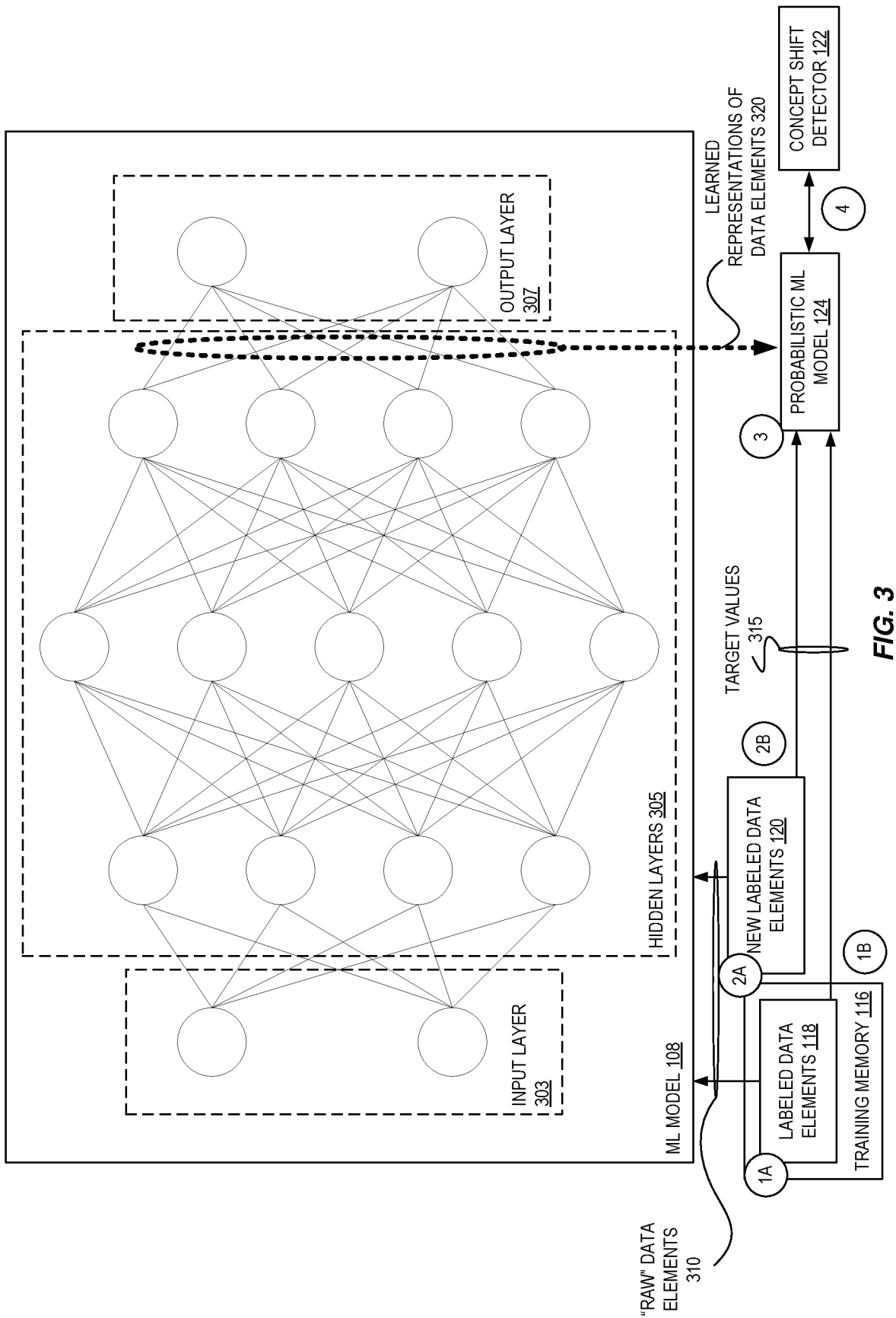
FIG. 3 is a diagram illustrating an exemplary configuration utilizing neural network penultimate layer learned feature representations for concept shift detection using probabilistic models according to some examples.

For example, with reference to FIG. 3, a training memory 116 (e.g., providing a moving window of training samples) is maintained that contains a subset (e.g., a uniform subset or approximate thereof) of the labeled data elements 118 observed since a most recent concept shift. FIG. 3 is a diagram illustrating an exemplary configuration utilizing neural network penultimate layer learned feature representations for concept shift detection using probabilistic models according to some examples.

As shown at circle (1A), when each new batch of labeled data elements 120 (sought to be used to update the memory and thus be used for retraining) is acquired, the concept shift detector can fit a probabilistic model 124 (e.g., a GP model) to the data currently existing in this training memory 116 (i.e., not yet including any of the new data elements). GP models, along with other types of models (such as some Bayesian models), are types of probabilistic models that can be used to beneficially provide posterior distributions that provide a useful way to quantify the uncertainty in model estimates. Accordingly, in some examples a GP model is used as the probabilistic model, though in other examples another type of model can be used, such as a Bayesian machine learning model having the ability to provide a calibrated uncertainty quantification.

In some examples, the probabilistic model uses as input not the raw data elements 310 themselves (e.g., images, records, text, numbers, etc.), but a learned representation 320 thereof (also referred to as an "encoding" or "embedding") obtained from the primary ML model 108 that is sought to be retrained. For example, in the case of an artificial neural network (such as the ML model 108 depicted herein), some examples use the representation 320 given by the activations of the neurons in the penultimate layer of the network as inputs for fitting the probabilistic model. In this simple illustrated example, the ML model has three layers—an input layer 303, one or more hidden layers 303, and an output layer 307. Each layer has multiple nodes connected to one or more nodes in the subsequent layer. Data features are fed to the input layer 305 and a prediction value is derived from the output layer 307 after processing in the hidden layers 305. However, as described herein, the values flowing into the output layer 307 may be used as the learned representation 320 of the data element, acting as a case-specific embedding that can be extremely effective for use in detecting concept drift. However, in some other examples, multiple such values taken from potentially more layers of the model may be used, or a gradient may be used, or values from a feature extractor module of a ML model.

With these learned representations 320 shown via circle (1A) and corresponding "labels" (or "target values" 315) shown via circle (1B), the probabilistic model can be trained. Afterward, upon being trained, the probabilistic model may then be used to make predictions for the new batch of data elements 120 (e.g., via learned representations 320 similarly obtained via use of the ML model 108 at circle (2A)), and the predictions (e.g., predictive distributions) generated at circle (3) can be compared against the provided true target "ground truth" labels (or target values 315, provided at circle (2B)) for that data by the concept shift detector 122 at circle (4).

When the true target values of the new batch of data elements are determined to be very unlikely under the predictive distribution provided by the probabilistic model (e.g., according to a defined criterion, such as a distance from a mean of the prediction such as a number of standard deviations away), this can only be explained by a concept shift. The well-calibrated predictive uncertainty of probabilistic models makes the technique particularly robust to covariate shift, as predictions for previously unobserved parts of the input space will be uncertain. At the same time, disclosed examples can leverage the representational power of the primary ML model (e.g., a neural network model or other type of model) being trained, e.g., via use of the representation (e.g., an encoding) of the input values. Accordingly, when a concept shift is detected, the memory can be cleared and replaced with a sample taken from only the new batch of data elements (e.g., via a subsampling technique, which may be uniform or approximately uniform), thus eliminating the "bad" data elements from use in retraining.

However, when the true target labels of the new batch of data elements are determined to be "sufficiently likely" under the predictive distribution of the probabilistic model, there is no indication of a concept shift, and the system can proceed in a typical manner, e.g., updating the memory based on the new batch of data elements and using that memory for retraining purposes. For example, the update may include utilizing a sampling technique called reservoir sampling, which guarantees the memory to be a uniform subsample of the data seen since the last concept shift.

Figure 4:
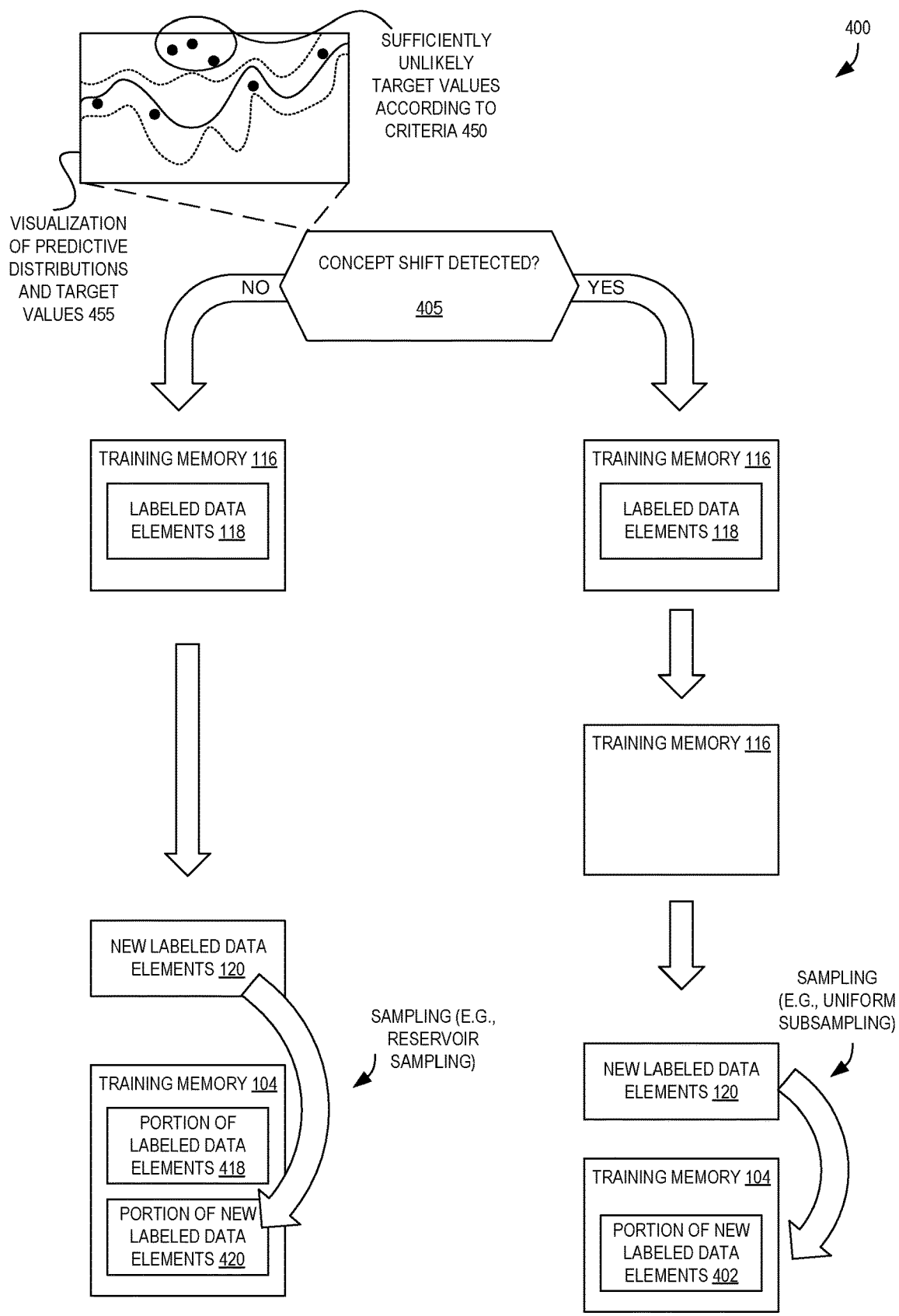
FIG. 4 is a diagram illustrating exemplary drift-adherent training memory updates according to some examples.

For example, FIG. 4 is a diagram illustrating exemplary drift-adherent training memory updates 400 according to some embodiments. In this example, if concept shift is not detected at block 405, in some embodiments a portion 420 of the new batch of labeled data elements 120 (e.g., a subset or the entirety) may be included into the training memory 116 (e.g., moving window), resulting in a portion (e.g., a subset or the entirety) of the previous set of labeled data elements 118 remaining in the memory. For example, examples may utilize a reservoir sampling technique to incorporate these new data elements 120 to ensure the training memory 116 includes a uniform subsample of the data seen since the last concept shift.

However, when concept shift is detected at block 405, the training memory 116 may be purged of all existing labeled data elements 118 (that include now-misleading samples) and instead, some or all of the new labeled data elements 120 may be inserted into the training memory 116. For example, in some examples, ones of the new data elements 120 are added to the memory according to a uniform subsampling technique.

As illustrated, at block 405 the concept shift detection may include the analysis of target values for the new batch of data elements together with predictive distributions generated by the Gaussian process model using the learned representations for the new batch of data elements, which is illustrated via visualization 455. In this example, the prediction of the Gaussian process model provides a "mean" value illustrated by the solid line, together with data allowing for upper and lower "confidence" bounds to be generated, which could be a number of standard deviations from the mean, for example. In this case, some of the data elements fall within these bounds, though notably three target values fall well outside of the bounds and thus are deemed "sufficiently unlikely" according to a criteria, which may be indicative of concept drift.

Returning again to FIG. 1, upon determining that a likelihood of concept drift exists satisfies one or more criteria (e.g., a user-specified criteria, or a self-specified criteria), the model monitor service 114 may perform one or more actions, which in some examples are controlled by the user 132. As one example, the model monitor service 114 at optional circle (8) may send one or more messages to the user 132 (e.g., emails, SMS messages, or the like) or otherwise cause (e.g., via a console type application provided to the user by the provider network 100) information regarding the detected likelihood of concept drive to be presented to the user—e.g., a concept drift likelihood score (e.g., a numeric score such as an integer between 0-100, a category score such as high/medium/low confidence, etc.). In some examples, the user 132 may then indicate whether further responsive actions are to be performed, e.g., by sending one or more commands to the provider network 100 to update the training memory 116 as described herein to eliminate the "old" problematic data elements and include new data elements therein at circle (9), to retrain the model at circle (10), and/or redeploy the ML model 108 at circle (11). However, in some examples, these actions may be automatically performed by the model monitor service 114 (e.g., by issuing commands to the other systems 110/112), either of its own accord based on configuration, or upon a user-specified rule (or rules) indicating that such actions (e.g., memory updating and retraining only, memory updating and retraining and redeployment, memory updating and retraining and/or model tuning, etc.) are to be performed based on different criteria, such as performing automatic memory updating, model retraining, model tuning, and/or redeployment of the model when a likelihood score of "high" occurs, and/or fewer or different actions when a different criteria is satisfied (e.g., when a likelihood score of "medium" occurs). Beneficially, this allows various users with different preferences to adapt the performance of the system to their own needs—e.g., some users will be very sensitive to concept drifts and want rapid corrective actions (e.g., users with models that serve a high volume of traffic or perform critical actions such as credit card fraud detection) and thus configure a low threshold criteria and/or highly-automated fixes, while other users may not need as aggressive of a response (e.g., a user with a recommendation engine for music may only want to be notified of such a drift, but not have any automated actions occur).

Figure 5:
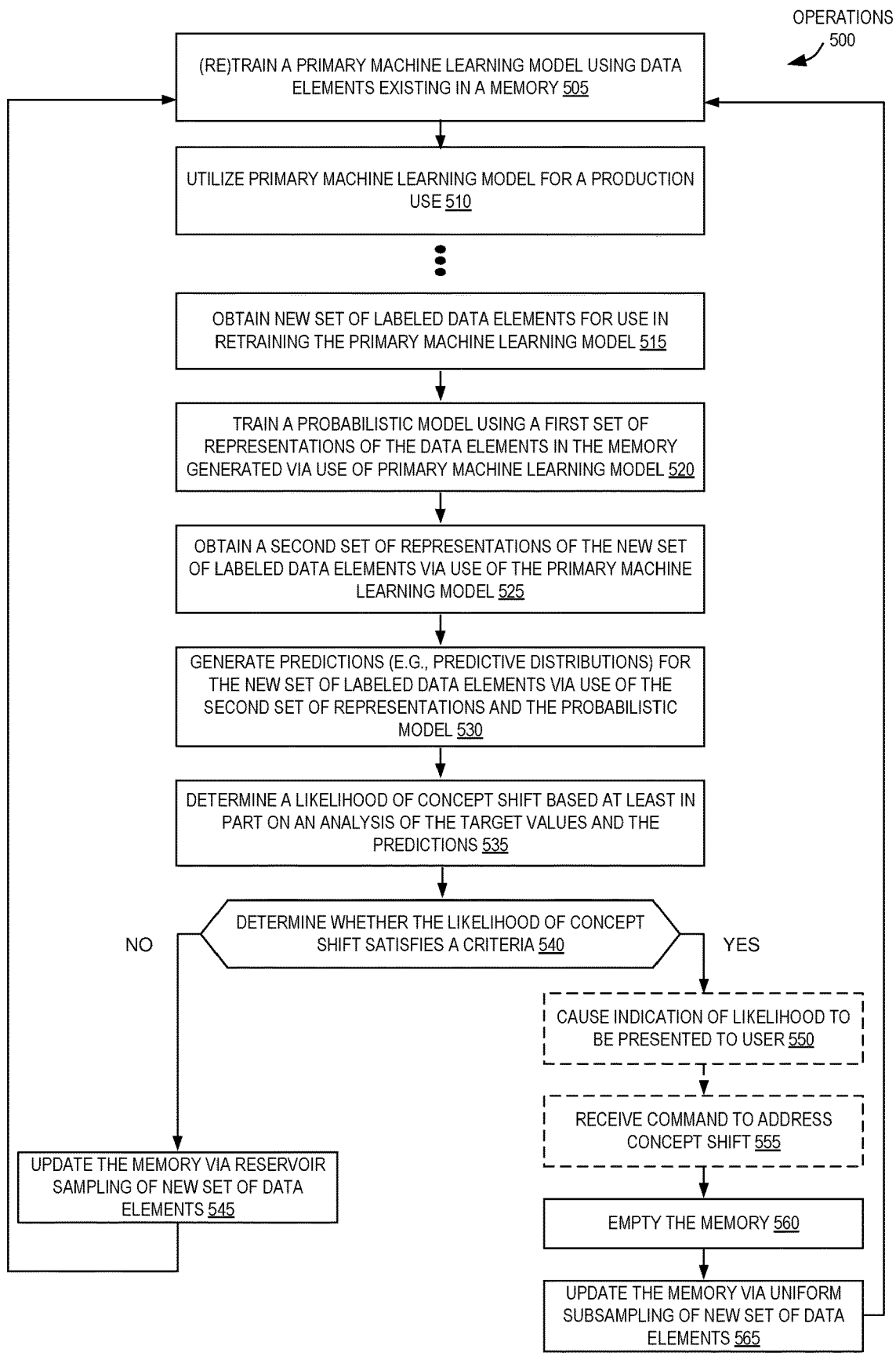
FIG. 5 is a flow diagram illustrating operations of a method for concept shift detection and correction using probabilistic models according to some examples.

FIG. 5 is a flow diagram illustrating operations 500 of a method for concept shift detection and correction using probabilistic models according to some examples. Some or all of the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by the model monitor service 114 (or performed by other entities responsive to commands from the model monitor service 114) of the other figures.

At block 505, a "primary" machine learning model is trained (or retrained) based on use of data elements (with corresponding labels/target values) existing in a memory. The memory may represent a sliding window of data elements, and thus the inclusion of data elements within the memory may change over time. At block 510, this primary ML model can be used for production uses, e.g., to serve inference requests originated by one or more applications.

At some point, a new set (or "batch") of labeled data elements are obtained at block 515. These labeled data elements may be provided by a user (or another system altogether) and may be uploaded to an object storage location (e.g., within a cloud provider network) accessible to the model monitor service 114 or sent directly to the model monitor service 114.

The model monitor service 114 at block 520 can train a probabilistic model (e.g., a GP model) using representations of the existing data elements in the memory. The representations can be obtained via use of the primary ML model, e.g., by inputting the data elements to the model and obtaining the output of the penultimate layer of the model (or another portion of the model, such as after one or more input layers that generate embeddings, etc.). The probabilistic model can thus be trained using the representations and the corresponding target values.

At block 525, the model monitor service 114 can obtain another set of representations of the "new" data elements (from block 515) via use of the primary ML model, and at block 530, generate predictions (e.g., predictive distributions) using these representations as input to the probabilistic model.

At block 535, the model monitor service 114 can determine a likelihood of concept drift/shift evidenced within the "new" set of data elements. This can include determining, for each data element, whether its target value lies within the predictive distribution generated for the representation of that data element, for example, determining whether the data element's target value is within two standard deviations from a mean of the predictive distribution, etc. In some examples, this block may include generating a per-data element likelihood of concept drift, and generating a single likelihood of concept drift for the new batch based on these (e.g., by identifying a number of data elements lying outside of the corresponding predictive distribution, by generating an average distance, etc.). Thus, a "final" likelihood of concept drift may be generated, which may be a numeric score (e.g., 95/100), a category (e.g., "high" or "red"), or the like.

The model monitor service 114 at block 540 may then determine whether the likelihood of concept drift value satisfies a criteria, which may be defined/configured by the user or by the service itself. For example, a user-specified criteria may be satisfied when the likelihood of concept drift value is in category "orange" or "red", or when the likelihood of concept drift value is greater than some numeric value.

When the criteria is not satisfied, the flow may continue to block 545, and the memory can be updated (e.g., in a typical manner), e.g., by use of reservoir sampling of the new data elements. When the criteria is satisfied, one or more actions can be performed, which may be configured by the user or by the service itself. In this example, the model monitor service 114 can optionally cause an indication of the likelihood of concept drift to be presented to a user (e.g., who owns, manages, or controls the model) at optional block 550, such as via a push notification or alert within a console web application. Thereafter, the user may decide to "fix" the concept shift, and may cause a command to be sent to the model monitor service 114 indicating a request to do so at block 555. However, in some embodiments, neither block 550 nor block 555 may occur, such as in automated configurations where corrective action may be implemented without needing user input. At block 560, then, the model monitor service 114 can cause the memory to be emptied, the memory updated at block 565 via a uniform sampling of the new data elements, and retraining of the primary ML model to occur at block 505.

FIG. 6 is a flow diagram illustrating operations of a method for concept shift detection and correction using probabilistic models and learned feature representations according to some examples. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the model monitor service 114 (or performed by other entities responsive to commands from the model monitor service 114) of the other figures.

The operations 600 include, at block 602, generating, via use of a first machine learning (ML) model trained based at least in part using representations generated by a second ML model, predictions for data elements. In some examples, the first ML model comprises a Gaussian process model. In some examples, the second ML model comprises a neural network model.

The operations 600 further include, in some examples prior to block 602, generating predictions for data elements via use of a first machine learning (ML) model trained based at least in part using representations generated via use of a second ML model.

The operations 600 further include, in some examples prior to block 602, training the first ML model based at least in part on use of previous data elements in a memory implementing a sliding window. In some examples, the training of the first ML model includes obtaining data generated by one or more non-final layers of the second ML model upon utilizing the previous data elements as input to the second ML model; and utilizing the data, or values generated based at least in part on the data, as the representations for use as inputs to train the first ML model.

In some examples, the first ML model comprises a probabilistic model, and the second ML model comprises a neural network model. In some examples, the first ML model comprises a Gaussian Process model.

The operations 600 further include, at block 604, determining, based at least in part on an analysis of the predictions and target values associated with the data elements, a likelihood of concept shift evidenced via the data elements. In some examples, determining the likelihood of concept shift includes, for a data element, of the data elements, determining that the target value associated with the data element is outside of a predictive distribution range of the prediction.

The operations 600 further include, at block 606, transmitting a message identifying the likelihood of concept shift. In some examples, the message is transmitted to another component in the provider network, and the operations 600 further include removing the previous data elements from the memory to yield an empty memory; inserting ones of the data elements into the empty memory to yield an updated memory; and retraining the second ML model based at least in part on use of the updated memory. In some examples, the inserting of the ones of the data elements into the memory includes a use of a subsampling technique.

The operations 600 further include, in some examples, receiving a user-specified concept shift threshold, where transmitting the message occurs responsive to determining that the likelihood of concept drift satisfies the user-specified concept shift threshold.

In some examples, the message is transmitted to a computing device associated with the user that causes the likelihood of concept shift to be presented or causes an indication that the likelihood of concept drift satisfied the user-specified concept shift threshold to be presented.

The operations 600 further include, in some examples, obtaining additional data elements; determining that an additional likelihood of concept shift evidenced based on the additional data elements does not satisfy a threshold criteria; inserting ones of the additional data elements into the memory according to a sampling technique to yield an updated memory; and retraining the second ML model based on use of the updated memory.

Figure 7:
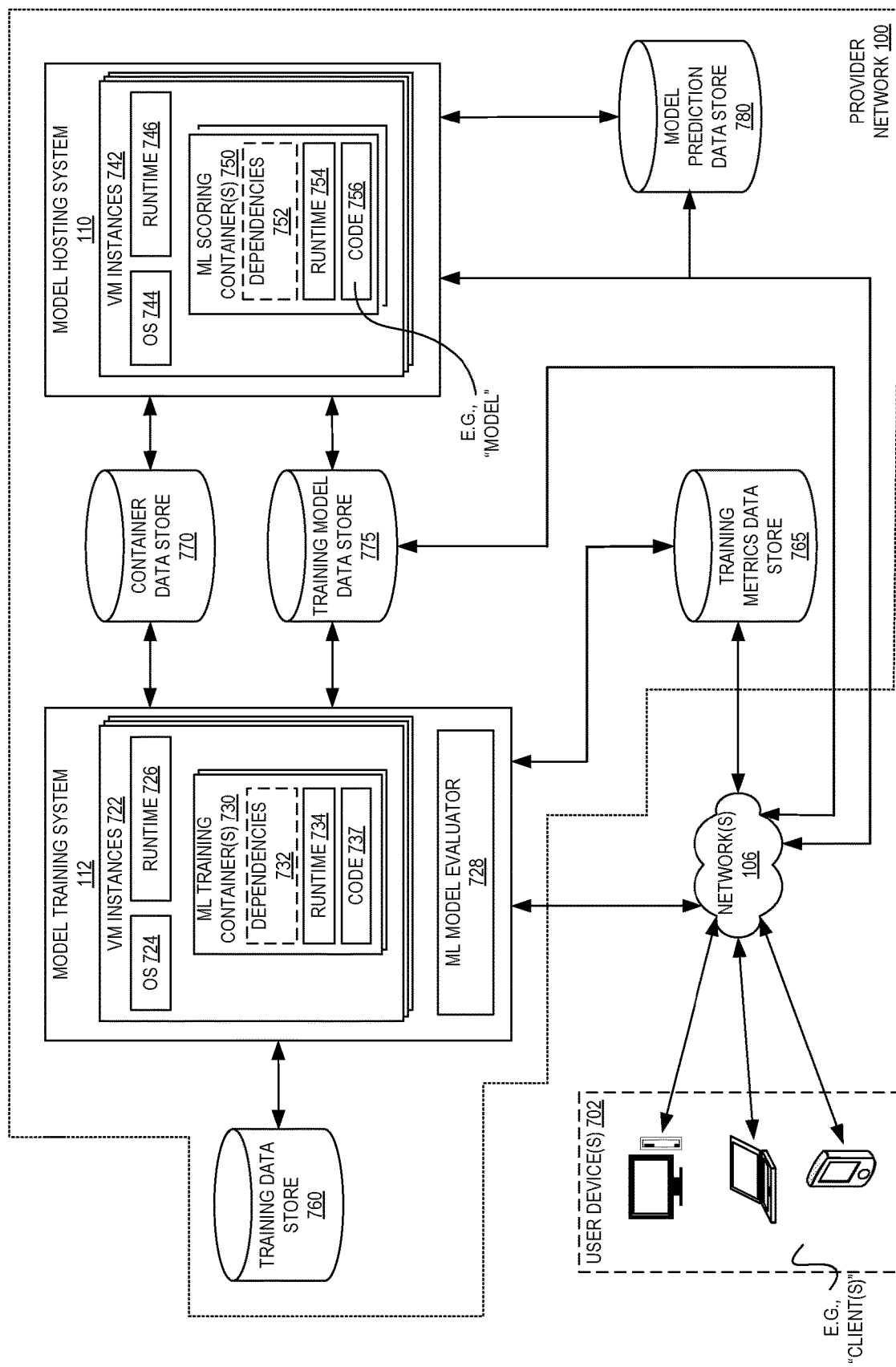
FIG. 7 is a block diagram of an illustrative operating environment in which machine learning models are trained and hosted according to some embodiments.

FIG. 7 is a block diagram of an illustrative operating environment in which ML models are trained and hosted according to some embodiments. The operating environment includes end user devices 702 (for example, computing devices(s), edge device(s)), a model training system 112, a model hosting system 110, a training data store 760, a training metrics data store 765, a container data store 770, a training model data store 775, and a model prediction data store 780. An ML service described herein may include one or more of these entities, such as the model hosting system 110, model training system 112, and so forth.

In some embodiments, users, by way of user devices 702, interact with the model training system 112 to provide data that causes the model training system 112 to train one or more ML models, for example, as described elsewhere herein. However, in some embodiments, other entities may so interact with the model training system 112 and/or model hosting system 110, such as another service of the provider network.

An ML model, generally, may be thought of as one or more equations that are "trained" using a set of data. In some embodiments, the model training system 112 provides ML functionalities as a web service, and thus messaging between user devices 702 and the model training system 112 (or provider network 100), and/or between components of the model training system 112 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 112 via frontend of the model training system 112. For example, a user device 702 can provide a training request to the frontend that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train an ML model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines an ML model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by an ML training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in a supported programming language. The model training system 112 then packages the algorithm into a container (optionally with other code, such as a "base" ML algorithm supplemented with user-provided code) that is eventually loaded into a virtual machine instance 722 for training an ML model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 112, where this algorithm/code may be containerized on its own or used together with an existing container having an ML framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 112 can retrieve the container image from the indicated location and create a container using the retrieved container image. The container is then loaded into a virtual machine instance 722 for training an ML model, as described in greater detail below.

The model training system 112 can use the information provided by the user device 702 to train an ML model in one or more pre-established virtual machine instances 722 in some embodiments. In particular, the model training system 112 includes a single physical computing device or multiple physical computing devices that are interconnected using one or more computing networks (not shown), where the physical computing device(s) host one or more virtual machine instances 722. The model training system 112 can handle the acquisition and configuration of compute capacity (for example, containers, instances, etc., which are described in greater detail below) based on the information describing the computing machine on which to train an ML model provided by the user device 702. The model training system 112 can then train ML models using the compute capacity, as is described in greater detail below. The model training system 112 can automatically scale up and down based on the volume of training requests received from user devices 702 via frontend, thereby relieving the user from the burden of having to worry about over-utilization (for example, acquiring too little computing resources and suffering performance issues) or under-utilization (for example, acquiring more computing resources than necessary to train the ML models, and thus overpaying).

In some embodiments, the virtual machine instances 722 are used to execute tasks. For example, such tasks can include training an ML model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be used to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines an ML model. Changes made to the ML training containers 730 (for example, creation of new files, modification of existing files, deletion of files, etc.) are stored in the top container layer. If an ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines an ML model, which may reference (or use) code or libraries from dependencies 732. The runtime 734 is configured to execute the code 737 in response to an instruction to begin ML model training. Execution of the code 737 results in the generation of model data, as described in greater detail below.

In some embodiments, the code 737 includes executable instructions that represent algorithms that define different ML models. For example, the code 737 includes one set of executable instructions that represent a first algorithm that defines a first ML model and a second set of executable instructions that represent a second algorithm that defines a second ML model. In some embodiments, the virtual machine instance 722 executes the code 737 and trains all of the ML models. In some embodiments, the virtual machine instance 722 executes the code 737, selecting one of the ML models to train. For example, the virtual machine instance 722 can identify a type of training data indicated by the training request and select an ML model to train (for example, execute the executable instructions that represent an algorithm that defines the selected ML model) that corresponds with the identified type of training data.

In some embodiments, the runtime 734 is the same as the runtime 726 used by the virtual machine instance 722. In some embodiments, the runtime 734 is different than the runtime 726 used by the virtual machine instance 722.

In some embodiments, the model training system 112 uses one or more container images included in a training request (or a container image retrieved from the container data store 770 in response to a received training request) to create and initialize an ML training container 730 in a virtual machine instance 722. For example, the model training system 112 creates an ML training container 730 that includes the container image(s) and/or a top container layer.

Prior to beginning the training process, in some embodiments, the model training system 112 retrieves training data from the location indicated in the training request. For example, the location indicated in the training request can be a location in the training data store 760. Thus, the model training system 112 retrieves the training data from the indicated location in the training data store 760. In some embodiments, the model training system 112 does not retrieve the training data prior to beginning the training process. Rather, the model training system 112 streams the training data from the indicated location during the training process. For example, the model training system 112 can initially retrieve a portion of the training data and provide the retrieved portion to the virtual machine instance 722 training the ML model. Once the virtual machine instance 722 has applied and used the retrieved portion or once the virtual machine instance 722 is about to use all of the retrieved portion (for example, a buffer storing the retrieved portion is nearly empty), then the model training system 112 can retrieve a second portion of the training data and provide the second retrieved portion to the virtual machine instance 722, and so on.

To perform the ML model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train an ML model. The virtual machine instance 722 executes some or all of the executable instructions according to the hyperparameter values included in the training request. As an illustrative example, the virtual machine instance 722 trains an ML model by identifying values for certain parameters (for example, coefficients, weights, centroids, etc.). The identified values depend on hyperparameters that define how the training is performed. Thus, the virtual machine instance 722 can execute the executable instructions to initiate an ML model training process, where the training process is run using the hyperparameter values included in the training request. Execution of the executable instructions can include the virtual machine instance 722 applying the training data retrieved by the model training system 112 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the ML model being trained, such as a number of layers in the ML model, hyperparameters of the ML model, coefficients of the ML model, weights of the ML model, and/or the like. In particular, the generated model data includes values for the characteristics that define an ML model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 112 itself) pulls the generated model data from the ML training container 730 and stores the generated model data in the training model data store 775 in an entry associated with the virtual machine instance 722 and/or the ML model being trained. In some embodiments, the virtual machine instance 722 generates a single file that includes model data and stores the single file in the training model data store 775. In some embodiments, the virtual machine instance 722 generates multiple files during the course of training an ML model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained ML model during different stages of the training process. Accordingly, before training is complete, a user (via the user device 702) or another client can submit a deployment and/or execution request in a manner as described below to deploy and/or execute a version of a partially trained ML model (for example, an ML model trained as of a certain stage in the training process). A version of a partially trained ML model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 112 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training an ML model and that a particular ML training container 730 receiving the configuration information is ML training container 730 number X of N), which can be included in the resulting model data. By parallelizing the training process, the model training system 112 can significantly reduce the training time in some embodiments.

In some embodiments, a plurality of virtual machine instances 722 execute code 737 stored in a plurality of ML training containers 730. For example, the resources used to train a particular ML model can exceed the limitations of a single virtual machine instance 722. However, the algorithm included in the container image can be in a format that allows for the parallelization of the training process. Thus, the model training system 112 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 112 can further provide configuration information to each ML training container 730 via the virtual machine instances 722 (for example, information indicating that N ML training containers 730 are collectively training an ML model and that a particular ML training container 730 receiving the configuration information is ML training container 730 number X of N, information indicating that M virtual machine instances 722 are collectively training an ML model and that a particular ML training container 730 receiving the configuration information is initialized in virtual machine instance 722 number Y of M, etc.), which can be included in the resulting model data. As described above, by parallelizing the training process, the model training system 112 can significantly reduce the training time in some embodiments.

In some embodiments, the model training system 112 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 112 includes an ML model evaluator 728. The ML model evaluator 728 can monitor virtual machine instances 722 as ML models are being trained, obtaining the generated model data and processing the obtained model data to generate model metrics. For example, the model metrics can include quality metrics, such as an error rate of the ML model being trained, a statistical distribution of the ML model being trained, a latency of the ML model being trained, a confidence level of the ML model being trained (for example, a level of confidence that the accuracy of the ML model being trained is known, etc. The ML model evaluator 728 can obtain the model data for an ML model being trained and evaluation data from the training data store 760. The evaluation data is separate from the data used to train an ML model and includes both input data and expected outputs (for example, known results), and thus the ML model evaluator 728 can define an ML model using the model data and execute the ML model by providing the input data as inputs to the ML model. The ML model evaluator 728 can then compare the outputs of the ML model to the expected outputs and determine one or more quality metrics of the ML model being trained based on the comparison (for example, the error rate can be a difference or distance between the ML model outputs and the expected outputs).

The ML model evaluator 728 periodically generates model metrics during the training process and stores the model metrics in the training metrics data store 765 in some embodiments. While the ML model is being trained, a user, via the user device 702, can access and retrieve the model metrics from the training metrics data store 765. The user can then use the model metrics to determine whether to adjust the training process and/or to stop the training process. For example, the model metrics can indicate that the ML model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 112 to modify the ML model being trained (for example, transmit a modification request). The request can include a new or modified container image, a new or modified algorithm, new or modified hyperparameter(s), and/or new or modified information describing the computing machine on which to train an ML model. The model training system 112 can modify the ML model accordingly. For example, the model training system 112 can cause the virtual machine instance 722 to optionally delete an existing ML training container 730, create and initialize a new ML training container 730 using some or all of the information included in the request, and execute the code 737 stored in the new ML training container 730 to restart the ML model training process. As another example, the model training system 112 can cause the virtual machine instance 722 to modify the execution of code stored in an existing ML training container 730 according to the data provided in the modification request. In some embodiments, the user, via the user device 702, can transmit a request to the model training system 112 to stop the ML model training process. The model training system 112 can then instruct the virtual machine instance 722 to delete the ML training container 730 and/or to delete any model data stored in the training model data store 775.

As described below, in some embodiments, the model data stored in the training model data store 775 is used by the model hosting system 110 to deploy ML models. Alternatively or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines an ML model. Thus, the robotic device can provide the captured input data as an input to the ML model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of ML model training in ML training container(s) 730) in response to training requests.

In some embodiments, the model training system 112 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 110, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 110 includes a single physical computing device or multiple physical computing devices that are interconnected using one or more computing networks (not shown), where the physical computing device(s) host one or more virtual machine instances 742. The model hosting system 110 can handle the acquisition and configuration of compute capacity (for example, containers, instances, etc.) based on demand for the execution of trained ML models. The model hosting system 110 can then execute ML models using the compute capacity, as is described in greater detail below. The model hosting system 110 can automatically scale up and down based on the volume of execution requests received from user devices 702 via frontend 749 of the model hosting system 110, thereby relieving the user from the burden of having to worry about over-utilization (for example, acquiring too little computing resources and suffering performance issues) or under-utilization (for example, acquiring more computing resources than necessary to run the ML models, and thus overpaying).

In some embodiments, the virtual machine instances 742 are used to execute tasks. For example, such tasks can include executing an ML model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be used to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines an ML model. Changes made to the ML scoring containers 750 (for example, creation of new files, modification of existing files, deletion of files, etc.) are stored in the top container layer. If an ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines an ML model, which may reference dependencies 752. The code 756 can also include model data that represent characteristics of the defined ML model, as described in greater detail below. The runtime 754 is configured to execute the code 756 in response to an instruction to begin execution of an ML model. Execution of the code 756 results in the generation of outputs (for example, predicted results), as described in greater detail below.

In some embodiments, the runtime 754 is the same as the runtime 746 used by the virtual machine instance 742. In some embodiments, runtime 754 is different than the runtime 746 used by the virtual machine instance 742.

In some embodiments, the model hosting system 110 uses one or more container images included in a deployment request (or a container image retrieved from the container data store 770 in response to a received deployment request) to create and initialize an ML scoring container 750 in a virtual machine instance 742. For example, the model hosting system 110 creates an ML scoring container 750 that includes the container image(s) and/or a top container layer.

As described above, a user device 702 or other client can submit a deployment request and/or an execution request to the model hosting system 110 via the frontend 749 in some embodiments. A deployment request causes the model hosting system 110 to deploy a trained ML model into a virtual machine instance 742. For example, the deployment request can include an identification of an endpoint (for example, an endpoint name, such as an HTTP endpoint name) and an identification of one or more trained ML models (for example, a location of one or more model data files stored in the training model data store 775). Optionally, the deployment request also includes an identification of one or more container images stored in the container data store 770.

Upon receiving the deployment request, the model hosting system 110 initializes ones or more ML scoring containers 750 in one or more hosted virtual machine instance 742. In embodiments in which the deployment request includes an identification of one or more container images, the model hosting system 110 forms the ML scoring container(s) 750 from the identified container image(s). For example, a container image identified in a deployment request can be the same container image used to form an ML training container 730 used to train the ML model corresponding to the deployment request. Thus, the code 756 of the ML scoring container(s) 750 includes one or more executable instructions in the container image(s) that represent an algorithm that defines an ML model. In embodiments in which the deployment request does not include an identification of a container image, the model hosting system 110 forms the ML scoring container(s) 750 from one or more container images stored in the container data store 770 that are appropriate for executing the identified trained ML model(s). For example, an appropriate container image can be a container image that includes executable instructions that represent an algorithm that defines the identified trained ML model(s).

The model hosting system 110 further forms the ML scoring container(s) 750 by retrieving model data corresponding to the identified trained ML model(s) in some embodiments. For example, the deployment request can identify a location of model data file(s) stored in the training model data store 775. In embodiments in which a single model data file is identified in the deployment request, the model hosting system 110 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 110 unarchives or decompresses the model data file to obtain multiple individual files and inserts the individual files into the ML scoring container 750. In some embodiments, the model hosting system 110 stores the model data file in the same location as the location in which the model data file was stored in the ML training container 730 that generated the model data file. For example, the model data file initially was stored in the top container layer of the ML training container 730 at a certain offset, and the model hosting system 110 then stores the model data file in the top container layer of the ML scoring container 750 at the same offset.

In embodiments in which multiple model data files are identified in the deployment request, the model hosting system 110 retrieves the identified model data files from the training model data store 775. The model hosting system 110 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained ML models because the trained ML models are related (for example, the output of one trained ML model is used as an input to another trained ML model). Thus, the user may desire to deploy multiple ML models to eventually receive a single output that relies on the outputs of multiple ML models.

In some embodiments, the model hosting system 110 associates the initialized ML scoring container(s) 750 with the endpoint identified in the deployment request. For example, each of the initialized ML scoring container(s) 750 can be associated with a network address. The model hosting system 110 can map the network address(es) to the identified endpoint, and the model hosting system 110 or another system (for example, a routing system, not shown) can store the mapping. Thus, a user device 702 can refer to trained ML model(s) stored in the ML scoring container(s) 750 using the endpoint. This allows for the network address of an ML scoring container 750 to change without causing the user operating the user device 702 to change the way in which the user refers to a trained ML model.

Once the ML scoring container(s) 750 are initialized, the ML scoring container(s) 750 are ready to execute trained ML model(s). In some embodiments, the user device 702 transmits an execution request to the model hosting system 110 via the frontend 749, where the execution request identifies an endpoint and includes an input to an ML model (for example, a set of input data). The model hosting system 110 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 110 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the ML model characteristics and the input parameters provided, execution of the executable instructions by the virtual machine instance 742 can be completed, resulting in an output.

In some embodiments, the virtual machine instance 742 stores the output in the model prediction data store 780. Alternatively or in addition, the virtual machine instance 742 transmits the output to the user device 702 that submitted the execution result via the frontend 749.

In some embodiments, the execution request corresponds to a group of related trained ML models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container 750, providing the received output as an input parameter to the executable instructions in the second code 756. The second ML scoring container 750 further includes a model data file stored therein, which is read by the executable instructions in the second code 756 to determine values for the characteristics defining the ML model. Execution of the second code 756 results in a second output. The virtual machine instance 742 that initialized the second ML scoring container 750 can then transmit the second output to the model prediction data store 780 and/or the user device 702 via the frontend 749 (for example, if no more trained ML models are needed to generate an output) or transmit the second output to a third ML scoring container 750 initialized in the same or different virtual machine instance 742 (for example, if outputs from one or more additional trained ML models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the operating environment supports many different types of ML models, such as multi arm bandit models, reinforcement learning models, ensemble ML models, deep learning models, and the like.

The model training system 112 and the model hosting system 110 depicted in FIG. 7 are not meant to be limiting. For example, the model training system 112 and/or the model hosting system 110 could also operate within a computing environment having a fewer or greater number of devices than are illustrated in FIG. 7. Thus, the depiction of the model training system 112 and/or the model hosting system 110 in FIG. 7 may be taken as illustrative and not limiting to the present disclosure. For example, the model training system 112 and/or the model hosting system 110 or various constituents thereof could implement various web services components, hosted or "cloud" computing environments, and/or peer-to-peer network configurations to implement at least a portion of the processes described herein. In some embodiments, the model training system 112 and/or the model hosting system 110 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend processes all training requests received from clients and provisions virtual machine instances 722. In some embodiments, the frontend serves as a front door to all the other services provided by the model training system 112. The frontend processes the requests and makes sure that the requests are properly authorized. For example, the frontend may determine whether the user associated with the training request is authorized to initiate the training process.

Similarly, frontend 749 processes all deployment and execution requests received from user devices 702 and provisions virtual machine instances 742. In some embodiments, the frontend 749 serves as a front door to all the other services provided by the model hosting system 110. The frontend 749 processes the requests and makes sure that the requests are properly authorized. For example, the frontend 749 may determine whether the user associated with a deployment request or an execution request is authorized to access the indicated model data and/or to execute the indicated ML model.

The training data store 760 stores training data and/or evaluation data. The training data can be data used to train ML models and evaluation data can be data used to evaluate the performance of ML models. In some embodiments, the training data and the evaluation data have common data. In some embodiments, the training data and the evaluation data do not have common data. In some embodiments, the training data includes input data and expected outputs. While the training data store 760 is depicted as being located external to the model training system 112 and the model hosting system 110, this is not meant to be limiting. For example, in some embodiments not shown, the training data store 760 is located internal to at least one of the model training system 112 or the model hosting system 110.

In some embodiments, the training metrics data store 765 stores model metrics. While the training metrics data store 765 is depicted as being located external to the model training system 112 and the model hosting system 110, this is not meant to be limiting. For example, in some embodiments not shown, the training metrics data store 765 is located internal to at least one of the model training system 112 or the model hosting system 110.

The container data store 770 stores container images, such as container images used to form ML training containers 730 and/or ML scoring containers 750, that can be retrieved by various virtual machine instances 722 and/or 742. While the container data store 770 is depicted as being located external to the model training system 112 and the model hosting system 110, this is not meant to be limiting. For example, in some embodiments not shown, the container data store 770 is located internal to at least one of the model training system 112 and the model hosting system 110.

The training model data store 775 stores model data files. In some embodiments, some of the model data files are comprised of a single file, while other model data files are packages of multiple individual files. While the training model data store 775 is depicted as being located external to the model training system 112 and the model hosting system 110, this is not meant to be limiting. For example, in some embodiments not shown, the training model data store 775 is located internal to at least one of the model training system 112 or the model hosting system 110.

The model prediction data store 780 stores outputs (for example, execution results) generated by the ML scoring containers 750 in some embodiments. While the model prediction data store 780 is depicted as being located external to the model training system 112 and the model hosting system 110, this is not meant to be limiting. For example, in some embodiments not shown, the model prediction data store 780 is located internal to at least one of the model training system 112 and the model hosting system 110.

While the model training system 112, the model hosting system 110, the training data store 760, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as an ML service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 112 and/or the model hosting system 110 provides the user devices 702 with one or more user interfaces, command-line interfaces (CLIs), application programing interfaces (API), and/or other programmatic interfaces for submitting training requests, deployment requests, and/or execution requests. In some embodiments, the user devices 702 can execute a stand-alone application that interacts with the model training system 112 and/or the model hosting system 110 for submitting training requests, deployment requests, and/or execution requests.

Figure 8:
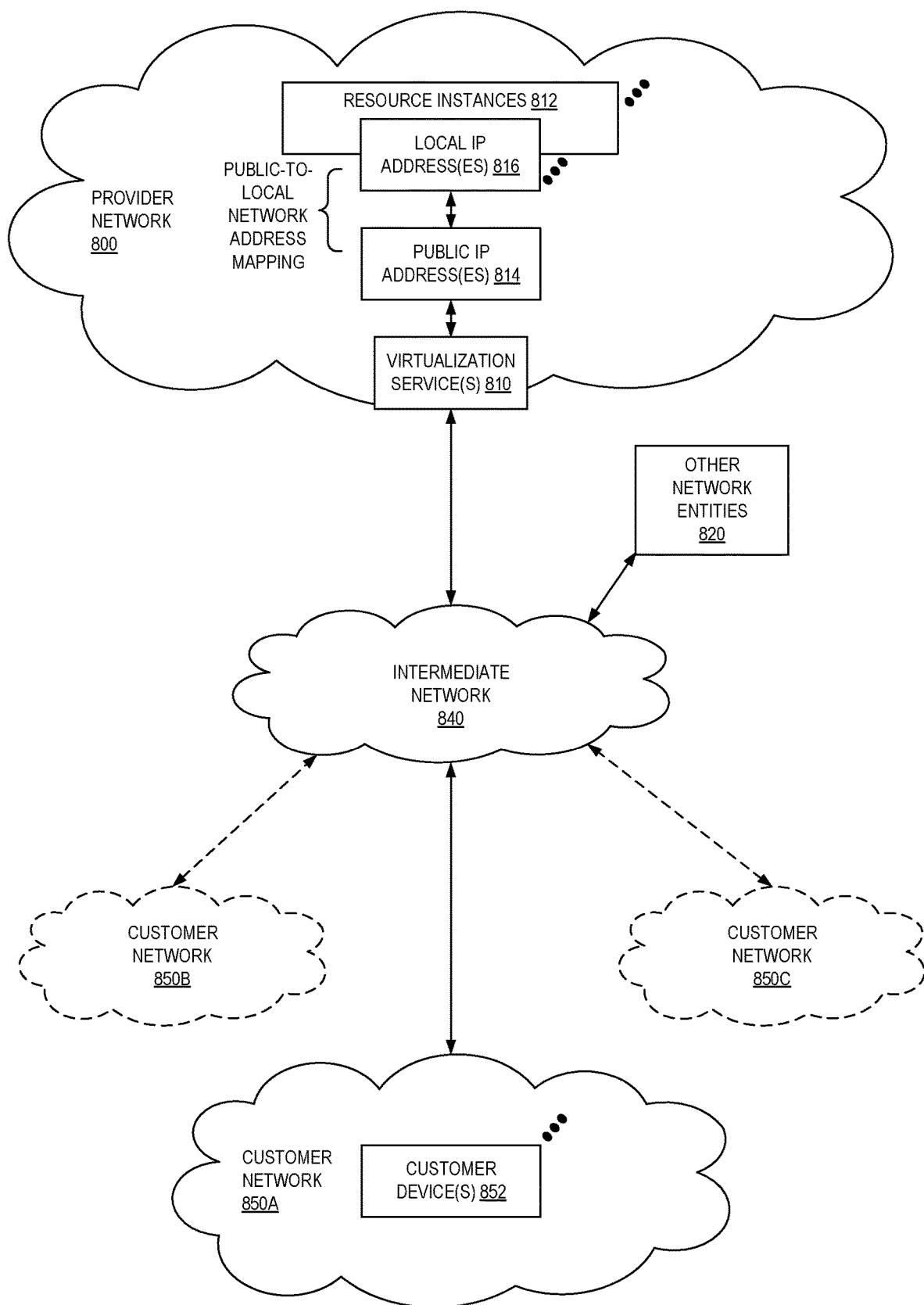
FIG. 8 illustrates an example provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
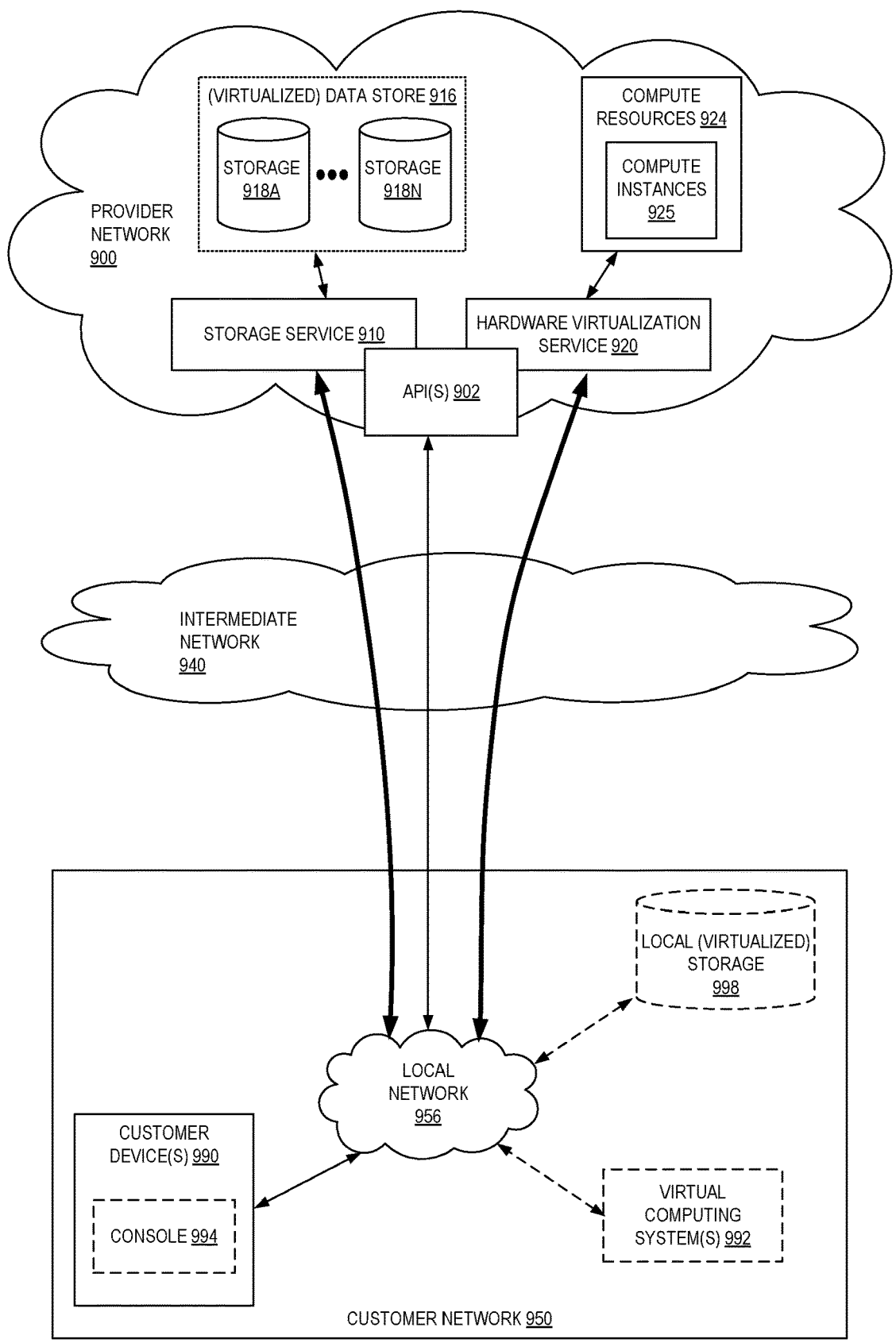
FIG. 9 is a block diagram of an example provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Illustrative Systems

Figure 10:
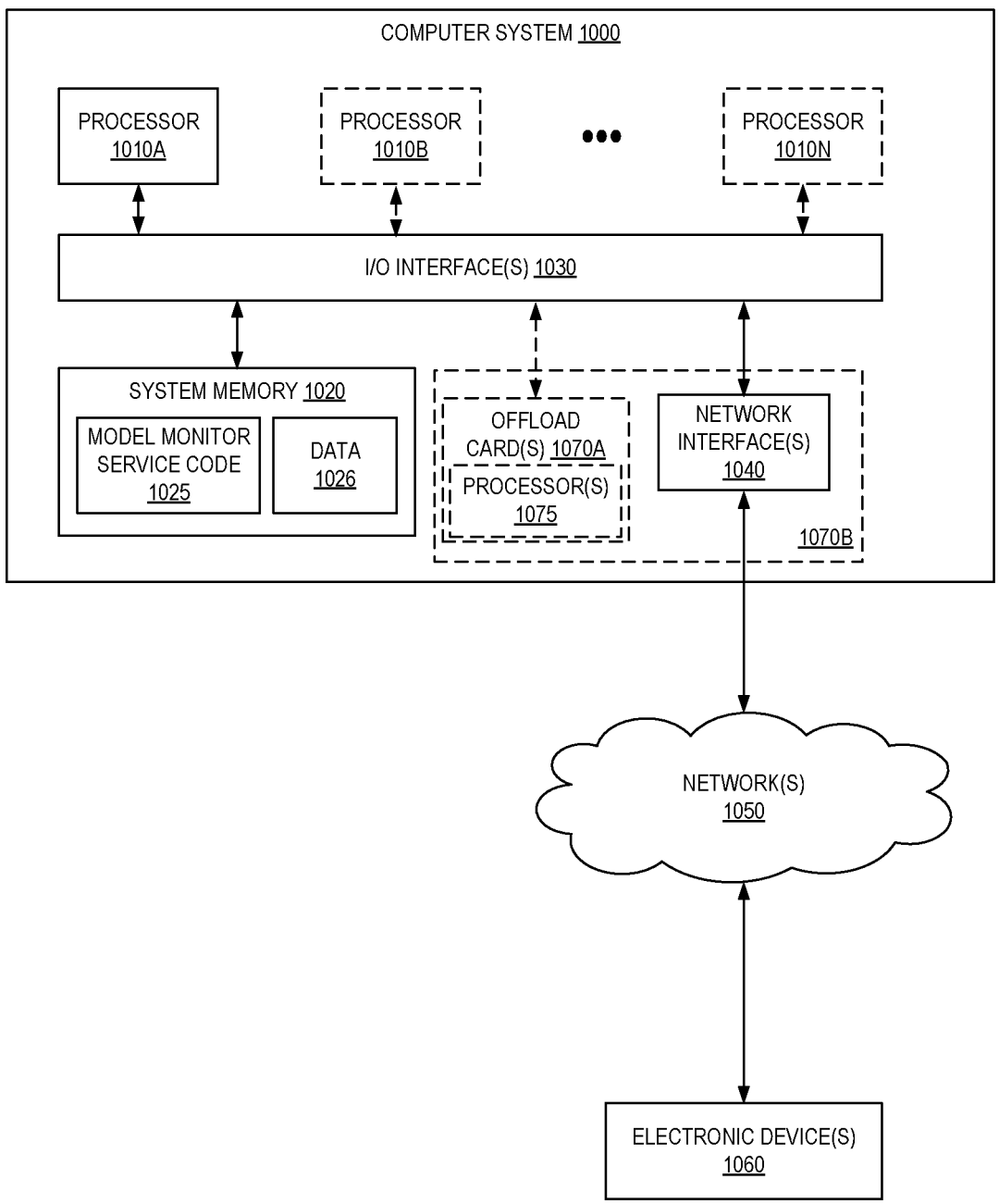
FIG. 10 is a block diagram illustrating an example computer system that can be used in some examples.

In some examples, a system that implements a portion or all of the techniques described herein can include a general-purpose computer system, such as the computer system 1000 illustrated in FIG. 10, that includes, or is configured to access, one or more computer-accessible media. In the illustrated example, the computer system 1000 includes one or more processors 1010 coupled to a system memory 1020 via an input/output (I/O) interface 1030. The computer system 1000 further includes a network interface 1040 coupled to the I/O interface 1030. While FIG. 10 shows the computer system 1000 as a single computing device, in various examples the computer system 1000 can include one computing device or any number of computing devices configured to work together as a single computer system 1000.

In various examples, the computer system 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as model monitor service code 1025 (e.g., executable to implement, in whole or in part, the model monitor service 114) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computer system 1000 and other devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computer system 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 918A-918N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   retraining a primary machine learning (ML) model based at least in part on use of a first batch of data elements in a sliding window of a memory;
   obtaining a second batch of data elements to be used as part of retraining the primary ML model, wherein each of the second batch of data elements is associated with a corresponding target value;
   training a gaussian process (GP) ML model based at least in part on use of representations of the first batch of data elements generated at least in part via use of the primary ML model;
   generating predictions for the second batch of data elements, via use of the GP model, based on use of representations of the second batch of data elements generated at least in part via use of the primary ML model;
   determining a likelihood of concept shift evidenced within the second batch of data elements based at least in part on an analysis of the predictions and target values associated with the second batch of data elements;
   determining that the likelihood of concept shift satisfies a criteria; and
   transmitting a message identifying the likelihood of concept shift.

2. The computer-implemented method of claim 1, further comprising:
   removing the first batch of data elements from the memory;
   inserting ones of the second batch of data elements into the memory; and
   retraining the primary ML model based on use of the inserted ones of the second batch of data elements in the memory.

3. The computer-implemented method of claim 1, wherein determining the likelihood of concept drift includes:
   determining, for a data element of the second batch of data elements, that the target value associated with the data element is outside a predictive distribution range of the prediction.

4. A computer-implemented method comprising:
   training a first machine learning (ML) model based at least in part on use of previous data elements in a memory implementing a sliding window;
   generating predictions for data elements via use of the first ML model, wherein the first ML model was trained based at least in part using representations generated via use of a second ML model;
   determining, based at least in part on an analysis of the predictions and target values associated with the data elements, a likelihood of concept shift evidenced via the data elements;
   transmitting a message identifying the likelihood of concept shift, wherein the message is transmitted to another component in a provider network;
   removing the previous data elements from the memory to yield an empty memory;
   inserting ones of the data elements into the empty memory to yield an updated memory; and
   retraining the second ML model based at least in part on use of the updated memory.

5. The computer-implemented method of claim 4, wherein the inserting of the ones of the data elements into the memory includes a use of a subsampling technique.

6. The computer-implemented method of claim 4, wherein the training of the first ML model comprises:
   obtaining data generated by one or more non-final layers of the second ML model upon utilizing the previous data elements as input to the second ML model; and
   utilizing the data, or values generated based at least in part on the data, as the representations for use as inputs to train the first ML model.

7. The computer-implemented method of claim 4, wherein determining the likelihood of concept shift includes, for a data element, of the data elements, determining that the target value associated with the data element is outside of a predictive distribution range of the prediction.

8. The computer-implemented method of claim 4, wherein:
   the first ML model comprises a probabilistic model; and
   the second ML model comprises a neural network model.

9. The computer-implemented method of claim 8, wherein the first ML model comprises a Gaussian Process model.

10. The computer-implemented method of claim 4, further comprising:
    receiving a user-specified concept shift threshold,
    wherein transmitting the message occurs responsive to determining that the likelihood of concept drift satisfies the user-specified concept shift threshold.

11. The computer-implemented method of claim 10, wherein the message is transmitted to a computing device associated with a user that causes the likelihood of concept shift to be presented or causes an indication that the likelihood of concept drift satisfied the user-specified concept shift threshold to be presented.

12. The computer-implemented method of claim 4, further comprising:
    obtaining additional data elements;
    determining that an additional likelihood of concept shift evidenced based on the additional data elements does not satisfy a threshold criteria;
    inserting ones of the additional data elements into a memory according to a sampling technique to yield an updated memory; and
    retraining the second ML model based on use of the updated memory.

13. A system comprising:
    a first one or more electronic devices to implement a model hosting service in a multi-tenant provider network; and
    a second one or more electronic devices to implement a model monitor service in the multi-tenant provider network, the model monitor service including instructions that upon execution cause the model monitor service to:

cause a model training system to train a first machine learning (ML) model based on use of previous data elements in a memory implementing a sliding window;

generate predictions for data elements via use of the first ML model trained based at least in part using representations generated via use of a second ML model, wherein the second ML model is hosted by the model hosting service;

determine, based at least in part on an analysis of the predictions and target values associated with the data elements, a likelihood of concept shift evidenced via the data elements; and transmit a message identifying the likelihood of concept shift, wherein the message is transmitted to the model training system, causing the model training system to:
- remove the previous data elements from the memory to yield an empty memory,
- insert ones of the data elements into the empty memory to yield an updated memory, and
- retrain the second ML model based on use of the updated memory.

14. The system of claim 13, wherein the model monitor service, to determine the likelihood of concept shift, is at least to determine, for a data element of the data elements, that the target value associated with the data element is outside of a predictive distribution range of the prediction.

15. The system of claim 13, wherein the message is transmitted to a computing device associated with a user that causes the likelihood of concept shift to be presented or causes an indication that the likelihood of concept drift satisfied a user-specified concept shift threshold to be presented.

16. The system of claim 13, wherein the first ML model comprises a Gaussian process (GP) model and the second ML model comprises a neural network model.

17. A computer-implemented method comprising:

generating predictions for data elements via use of a first machine learning (ML) model trained based at least in part using representations generated via use of a second ML model;

determining, based at least in part on an analysis of the predictions and target values associated with the data elements, a likelihood of concept shift evidenced via the data elements;

transmitting a message identifying the likelihood of concept shift;

obtaining additional data elements;

determining that an additional likelihood of concept shift evidenced based on the additional data elements does not satisfy a threshold criteria;

inserting ones of the additional data elements into a memory according to a sampling technique to yield an updated memory; and retraining the second ML model based on use of the updated memory.

18. The computer-implemented method of claim 17, wherein determining the likelihood of concept shift includes, for a data element, of the data elements, determining that the target value associated with the data element is outside of a predictive distribution range of the prediction.

19. The computer-implemented method of claim 17, wherein:
the first ML model comprises a probabilistic model; and
the second ML model comprises a neural network model.

20. The computer-implemented method of claim 17, further comprising:
receiving a user-specified concept shift threshold,
wherein transmitting the message occurs responsive to determining that the likelihood of concept drift satisfies the user-specified concept shift threshold.

* * * * *